Figure 1:
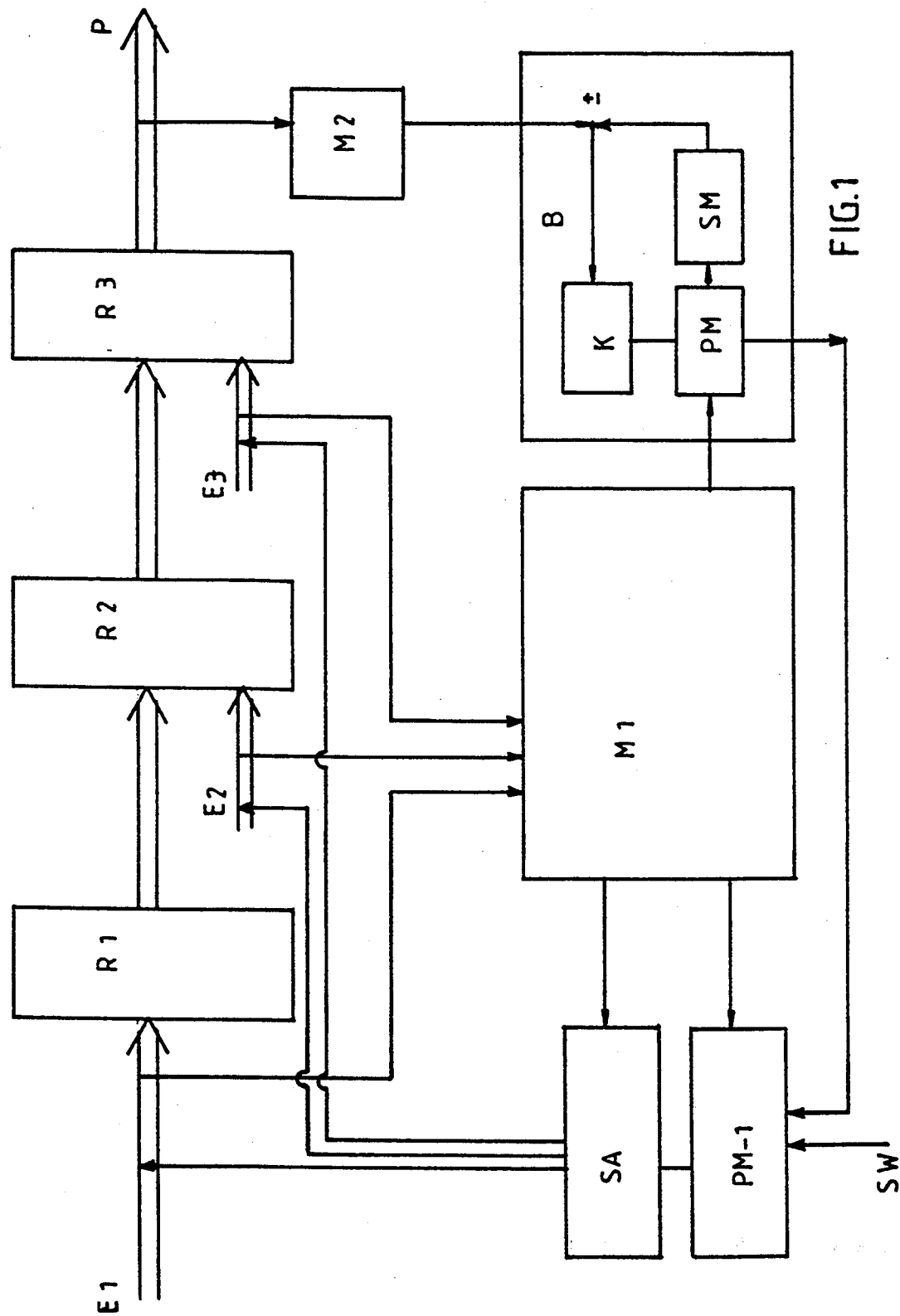

United States Patent [19]

Wulff et al.

[11] Patent Number: 5,412,060
[45] Date of Patent: May 2, 1995

[54] PROCESS FOR THE PRODUCTION OF POLYCARBONATE OF CONSTANT VISCOSITY

[75] Inventors: Claus Wulff, Krefeld; Uwe Hucks, Alpen; Rolf Bachmann, Bergisch Gladbach; Günther Weymans, Leverkusen; Jürgen Kadelka, Krefeld; Wolfgang Herrig, Bergisch Gladbach, all of Germany

[73] Assignee: Bayer Aktiengesellschaft, Leverkusen, Germany

[21] Appl. No.: 189,382

[22] Filed: Jan. 31, 1994

Related U.S. Application Data

[63] Continuation-in-part of Ser. No. 59,478, May 7, 1993, abandoned, which is a continuation-in-part of Ser. No. 931,743, Aug. 18, 1992, abandoned.

[30] Foreign Application Priority Data

Aug. 20, 1991 [DE] Germany ............... 41 27 512.8

[51] Int. Cl.$^6$ ............................................. C08G 64/00
[52] U.S. Cl. .................................... 528/196; 526/59; 526/60; 528/198; 528/199; 528/204; 528/125; 528/126; 528/171; 528/174
[58] Field of Search ............ 528/196, 198, 199, 204, 528/125, 126, 171, 174; 526/59, 60

[56] References Cited

U.S. PATENT DOCUMENTS

| | | | |
|---|---|---|---|
| 3,945,969 | 3/1976 | Horn et al. | 528/127 |
| 4,122,112 | 10/1978 | Koda et al. | 528/196 |
| 4,269,964 | 5/1981 | Freitag et al. | 528/126 |
| 4,447,655 | 5/1984 | Mendiratta | 568/724 |
| 4,460,752 | 7/1984 | Neuray et al. | 525/462 |
| 4,737,573 | 4/1988 | Silva et al. | 528/371 |
| 4,810,813 | 3/1989 | Kosky et al. | 558/281 |
| 4,847,352 | 7/1989 | Weston et al. | 528/196 |
| 4,864,011 | 9/1989 | Bussink et al. | 528/198 |
| 4,939,230 | 7/1990 | Munjal et al. | 528/198 |
| 4,959,456 | 9/1990 | Ashida et al. | 528/371 |

FOREIGN PATENT DOCUMENTS

| | | |
|---|---|---|
| 341225 | 1/1978 | Austria . |
| 1173998 | 9/1984 | Canada . |
| 306838 | 3/1989 | European Pat. Off. . |
| 1409614 | 10/1975 | United Kingdom . |

*Primary Examiner*—John Kight, III
*Assistant Examiner*—Terressa M. Mosley
*Attorney, Agent, or Firm*—Joseph C. Gil; Aron Preis

[57] ABSTRACT

The invention relates to a process for the production of polycarbonates by the two-phase interfacial method in which deviations between measured and estimated variables are continuously minimized by means of a suitably selected observer or filter system on the basis of a process model with an empirical Mark-Houwink relation adapted to the process. The variables estimated by the observer/filter are converted into control variables which are used to set input streams of the production process. Product quality is kept constant, changes in load or set values are quickly intercepted and even disturbances not readily accessible to measurement are taken into account by the process control.

9 Claims, 1 Drawing Sheet

PROCESS FOR THE PRODUCTION OF POLYCARBONATE OF CONSTANT VISCOSITY

CROSS-REFERENCE TO RELATED APPLICATION

The present application is a continuation-in-part of U.S. application Ser. No. 08/059,478 filed on May 7, 1993, now abandoned, which is a continuation-in-part of Ser. No. 07/931,743 filed on Aug. 18, 1992 now abandoned.

The two-phase interfacial process has been successfully used for the production of polycarbonates on an industrial scale. A number of publications are concerned with possibilities for improving the raw material yield (phosgene excess, bisphenol input, water volumes) and phase separation. Where the reaction is carried out continuously, dosage variations and other changes in the course of the reaction often occur in practice and have an important influence on the quality of the polycarbonate produced. An important quality feature is guaranteeing a constant viscosity of the polycarbonate, even during starting and stopping of the reaction and over long reaction times, despite slight variations in the quantities and concentrations of starting materials.

The viscosity of the polycarbonate may be characterized, for example, by the relative viscosity which is measured in a 5 g/liter polycarbonate/methylene chloride solution under atmospheric pressure at 25° C., based on the viscosity of pure methylene chloride. A sensitive measure for changes in viscosity is the viscosity number ("V number") which is defined by the following relation:

V number=100*(relative viscosity−1).

Different relative viscosities of a polycarbonate are produced according to the particular industrial application. It is important that viscosity should remain constant with a bandwidth in the V number of at most ±0.5, preferably at most ±0.3 and, more preferably, at most ±0.1. There has been no shortage of attempts to conduct the polycarbonate reaction in such a way that the relative viscosity of an industrial installation can be kept substantially reproducible and constant—with these variations at most—over long reaction times. Moreover, there are some publications which, in addition, improve the use of raw materials in the reaction. Several different dosing and reaction procedures have also been described in the prior art with a view inter alia to obtaining uniform viscosities for individual production batches.

Thus, DOS-2,305,144 describes a process for the continuous production of polycarbonates in which the two reactive phases are combined in a mixing zone in the presence of amines under substantially oil-in-water emulsion conditions and the phosgenation reaction takes place after mixing in a reaction zone. Special flow arrangements are said to ensure that the volume/time yield of the reaction is increased. The disadvantage of this known process lies in the large quantity of aqueous phase which supports phosgene secondary reactions.

According to DOS 2,353,939, the properties of a polycarbonate produced by the two-phase interfacial process are supposed to be able to be improved by control of the reaction by pH regulation. The disadvantage of this known process lies in the phosgene excess used, in addition to which the process is not continuous.

According to the teaching of EP 0,282,546, condensates terminated by chloroformyl groups are said to be produced in high phosgene yields by the two-phase interfacial process by the simultaneous and continuous introduction of a stable diphenol/water/sodium hydroxide suspension and phosgene into an organic phase and subsequent isolation of the reaction product. pH values of 2 to 5 are adjusted during the reaction. The disadvantage of this process lies in the technical difficulties involved in dosage of the suspension and in the low pH value which considerably increases the phosgenation time. Polycondensation measures are not described in this document.

According to EP-0,263,432, condensates terminated by chloroformyl groups or polycarbonates can be produced from aqueous diphenolate solution and organic solution by incorporation in a heterogeneous mixture at pH values of 8 to 11, at temperatures of 15° to 50° C. and with a phosgene excess of at least 10 mol-% phosgene and continuing the phosgenation reaction with simultaneous introduction of alkali metal or alkaline earth metal hydroxides. Preferred water-to-oil phase ratios are 0.4 to 1:1, water being subsequently introduced.

According to DOS-2,725,967, it is favorable to the phosgene yield of a continuous process initially to combine the aqueous phase and the organic phase containing phosgene in solution in a tube and subsequently to introduce the combined phases into a reactor of the tank type. The residence time in this tube should be between 0.5 and 15 seconds. The phosgene excess of the reaction is at least 10 mol-%. The disadvantage of this known process lies in the still extremely high phosgene excess. Another disadvantage is that the phosgenation reaction takes place at unfavorable phase ratios (oil to water=0.2 to 1) to ensure that the two phases can be safely separated on completion of the reaction.

According to EP 0,306,838, the phosgenation reaction is monitored in situ using an automatic Cl detector. Carrying out the process in this way suppresses variations in the chemism of the reaction and, apparently, improves the technical properties of the polycarbonates to a considerable extent. The basic concept of the process lies in the return of unreacted diphenolate to the process. However, the disadvantage of the process lies in the phosgene secondary reactions which are also reflected in this recycling measure. In addition, the stability of the V number is unsatisfactory.

It is known from EP 0,339,503-A2 that the phosgene secondary reactions can be increased in particular by the presence of a high initial sodium hydroxide concentration. In this document, therefore, the diphenol/sodium hydroxide/water solution is combined with the organic phase in an alkali:hydroxy ratio below 2:1 (less alkali metal hydroxide), oligomers having a molecular weight of 300 to 3,000 g/mol being formed in this first stage of the reaction. The water-to-oil phase ratios are greater than 1. In addition, the phosgene secondary reactions are still extremely unfavorable. The problem of V number stability is not solved here.

According to EP 0,304,691-A2, a fine emulsion (obtained by intensive mixing) is favorable to the course of the reaction in the two-phase interfacial process, albeit with a very high phosgene excess (20 to 100 mol-% excess). The high phosgene excess provides for good phase separation despite intensive mixing of the emulsion at the beginning of the reaction. However, the phosgene yield is extremely unfavorable.

A process for the production of reaction products of phosgene and dihydroxyphenols is described in WO 88/01 996. The introduction of special bisphenol suspensions is said to prevent phosgene secondary reactions and to make the process easier to carry out. The starting material used in this known process is a mixture of crystalline bisphenol A, alkali metal hydroxide and water in certain ratios and is subsequently converted by vigorous stirring into a suspension which remains stable for at least 30 minutes and which is continuously or discontinuously added, for example, to the synthesis of polycarbonates. Preferred compositions of the suspension are 47.9 to 52.0% bisphenol A, 52 to 47.9% water and 0.01 to 0.2% alkali metal hydroxide. In addition, compositions of 20 to 50% bisphenol A, 8 to 16% alkali metal hydroxide and 40 to 70% water can generally be used. Typical phosgenation temperatures are in the range from 14° to 40° C. The suspensions are not ultra-fine suspensions and the production time is too long, particularly for use in a continuous reaction, because the crystalline bisphenol A particles first have to be "partly dissolved" in the suspension.

U.S. Pat. No. 4,447,655 describes a special purification process for bisphenol A in which bisphenol A suspensions are washed with an organic washing medium in a continuous multiple-plate countercurrent extraction column. It is pointed out in this document regarding the suspension that the ratio of water to bisphenol A is not important to the washing process. The suspensions are prepared by stirring water at low temperature into a bisphenol melt, so that the mixture is cooled to temperatures of 60° to 70° C., and subsequently form crystals from the aqueous solution by continued cooling. These crystals may be subjected to the described purification.

According to AT 341,225, bisphenolate suspensions have advantages when used in the form of aqueous solutions in the two phase interfacial process because high-quality polycarbonates can be obtained from them in a high raw-material yield. In addition, these suspensions have the advantage that only a little water is used in the reaction.

According to EP 0,369,422-A2, the quantity of monocarbonates involved in the production of polycarbonate is kept small by optimized graduation of the addition of chain terminators as a function of time. It is logical that, by avoiding variations in the monocarbonate concentration, the relative viscosity of a polycarbonate solution is also improved in regard to its stability.

EP 0,262,695-A1 claims the use of a chloroformyl-terminated chain terminator for the production of polycarbonates. The quantity of monocarbonates is said to be particularly reduced in this way. This document refers to EP-A-0,036,080, to EP-A-0,010,602 and to EP-A 0,078,943.

DOS 1,943,803 describes a special process for the continuous production of polycarbonate oligomers in which oligomers are continuously produced in a tube reactor and are built up to the polymer by subsequent introduction of a molecular weight regulator and addition of catalysts.

The prior art cited above describes a number of teachings for improving the raw material yield and phase separation and special equipment and metering specifications with which the two-phase interfacial reaction can be carried out more favorably. However, it remains a fact that the relative viscosity of the polycarbonate is not sufficiently reproducible or constant under the known reaction conditions.

Suitable polycarbonates for the process are those based on known diphenols and mixtures of known diphenols. They have molecular weights Mw, measured as the weight average of the molecular weight distribution by gel permeation chromatography in methylene chloride, of 15,000 to 200,000 g/mol for non-uniformities $Un = Mw/Mn - 1$, where Mn is the number average molecular weight, of 0.1 to 10 and preferably 0.2 to 2. The polycarbonates may be both homopolymers and copolymers. The copolymers may be produced both as statistical copolymers and as block copolymers. In addition, the polymers may be branched and may contain special terminal groups.

Suitable diphenols are those corresponding to the formula HO—Z—OH, in which Z is an aromatic $C_{6-45}$ radical which may contain one or more aromatic nuclei, may be substituted and may contain aliphatic radicals or cycloaliphatic radicals or heteroatoms as bridge members. Examples are hydroquinone, resorcinol, dihydroxydiphenyls, bis-(hydroxyphenyl)-alkanes, bis-(hydroxyphenyl)-cycloalkanes, bis-(hydroxphenyl)-sulfides, bis-(hydrox -phenyl)-ethers, bis-(hydroxyphenyl)-ketones, bis-(hydroxphenyl)-sulfones, bis-(hydroxyphenyl)-sulfoxides, $\alpha,\alpha'$-bis-(hydroxyphenyl)-diisopropyl benzenes and nucleus alkylated and nucleus-halogenated compounds thereof.

These and other suitable other diphenols are described, for example, in U.S. Pat. Nos. 3,028,365, 2,999,835, 3,148,172, 3,275,601, 2,991,273, 3,271,367, 3,062,781, 2,970,131 and 2,999,846; in DE-OSS 1,570,703, 2,063,050, 2,063,052 and 2,211,956, in FR-PS 1,561,518 and in DE-OS 3,833,953 (LeA 26 396).

Preferred diphenols are 2,2-bis-(4-hydroxyphenyl)-propane (bisphenol A), 2,2-bis-(3,5-dimethyl-4-hydroxyphenyl)-propane (TMBPA), 1,1-bis-(hydroxyphenyl)-cyclohexane (bisphenol Z), 1,1-bis-(4-hydroxyphenyl)-3,3,5-trimethyl cyclohexane (HIP bisphenol).

It is emphasized at this juncture that the process according to the invention may be used for virtually any known diphenols which, in the presence of alkali metal hydroxide and water, dissolve in an aqueous phase or form suspensions which allow a substantially complete reaction of the diphenols in a two-phase interfacial reaction.

Suitable chain terminators and branching agents are known from the literature. Some are described, for example, in DE-OS 3,833,953. Preferred chain terminators are phenol, cumylphenol, isooctylphenol, p-tert. butylphenol. Preferred branching agents are trisphenols and tetraphenols and also 3,3-bis-(3-methyl-4-hydroxyphenyl)-2-oxo-2,3-dihydroindole.

Sodium hydroxide or potassium hydroxide is used as the alkali metal hydroxide. Alkaline earth metal hydroxides may also be used. Sodium hydroxide is preferred.

Suitable catalysts are, in principle, any of the known catalysts for the production of polycarbonates by the two-phase interfacial process. N-ethyl piperidine and triethyl amine are preferred.

The organic phase contains solvents or a solvent mixture which dissolve(s) polycarbonate. Suitable solvents are any known solvents which are capable of dissolving at least 5% by weight polycarbonate at temperatures around 25° C. and also mixtures thereof, even with organic non-solvents for polycarbonates, such as n-heptane for example. Preferred solvents are methylene chloride, toluene, acetone, monochlorobenzene, particularly preferred solvents being methylene chloride, monochlorobenzene and a mixture of both, more particularly mixtures of methylene chloride and monochlorobenzene in a ratio of 20:80 parts by weight to 75:25 parts by weight.

Known production steps—partly summarized in the prior art cited above—may be used in the production of the polycarbonates in accordance with the invention by the two-phase interfacial process.

In the first production step, therefore, the organic phase and the aqueous phase are continuously combined, optionally using a mixing element, the organic phase being a suitable solvent for the polycarbonate and already containing the phosgene and the aqueous phase consisting of water and a mixture of alkali metal hydroxide and phenolic components. The formation of monocarbonates (i.e. reaction products from the reaction of 2 mol equivalents chain terminators with 1 mol equivalent phosgene) is preferably avoided or reduced by introduction of the chain terminator after substantially complete reaction of the phosgene with the diphenols, for example after a residence time of at least 1 minute after combination of the aqueous and organic phases.

After a further residence time, catalyst and, optionally, chain terminator are continuously introduced and, after another residence time of 5 to 30 minutes, in which the reaction mixture may optionally be intensively mixed, the organic phase and the aqueous phase are separated, for example in gravity separators or centrifuges.

Details of the apparatus used can be found in the prior-art documents cited above. Thus, the two-phase interfacial process may be continuously carried out on the basis of the following steps:

1. combining the organic and aqueous reaction solution in a tank reactor with a circulation loop, optionally using a mixing element,
2. a water-in-oil emulsion preferably being formed in the tank reactor with the circulation loop; despite the heat of reaction, a temperature below 60° C., preferably below 45° C. is adjusted by a heat exchanger, the tank reactor with the circulation loop affords a residence time of at least 2 minutes and preferably 5 to 30 minutes and the emulsion is continuously removed from the tank reactor,
3. the emulsion is then introduced into a tube reactor which is equipped with mixing and dwell zones and which affords a total residence time of at least 2 minutes and preferably from 5 to 30 minutes, the emulsion—where it was previously a water-in-oil emulsion—changing into an oil-in-water emulsion shortly before, during or shortly after introduction of the catalyst.

The various metering possibilities and teachings for improved utilization of the starting materials which are described, for example, in German patent applications P 41 18 232, EP 0,262,695-A1, EP 0,369,422, DE-OS 1,943,803, may also be used.

Another preferred method for the production of the polycarbonates by a continuous two-phase interfacial process involves the following process steps:

1. preheating a 10 to 30% by weight sodium bisphenolate solution to at least 45° C., the percentages by weight being based on the weight of sodium bisphenolate in aqueous solution and the solution containing as little free sodium hydroxide as possible,
2. introducing gaseous phosgene into methylene chloride or chlorobenzene or into a mixture of methylene chloride/chlorobenzene, optionally under a pressure of 1 to 10 bar, in such quantities that a molar phosgene excess of 5 to 80 mol-%, based on the quantity of sodium bisphenolate used in step 1, is present,
3. the phosgene optionally being introduced with high-performance mixing units, optionally under pressure, in order to avoid a relatively large phosgene buffer in the production plant,
4. combining the two solutions in a mixer which delivers the mixed emulsion at least partly against gravity into a tube,
5. in which more sodium bisphenolate is optionally introduced after a residence time of at least 10 seconds without dissipation of the heat of reaction,
6. chain terminator and sodium hydroxide are optionally introduced into the reaction tube to establish a pH value of 11 to 14,
7. the heat of reaction is subsequently dissipated in a stirred tank and the polymer chain is built up with addition of sodium hydroxide and catalyst; the emulsion in the reaction tube may be both an oil-in-water emulsion and a water-in-oil emulsion, although an oil-in-water emulsion is present in the stirred tank.

Other possible apparatus and metering specifications suitable for use in accordance with the invention can be found in the cited prior art or similar known publications; alternatively, logical supplementary measures known in principle to the expert may be used.

In known processes, disturbances in the input variables and disturbances in the process result in considerable variations in the V number $= 100 \times$ (relative viscosity $-1$), even with conventional process management.

Accordingly, the problem addressed by the present invention was to modify management of the process in such a way that variations in the quality of the product, particularly in regard to viscosity, are reduced.

Subject matter of the invention is a process for the production of polycarbonate by the two-phase interfacial method in at least two reaction steps, in which a phosgene-containing organic phase with or without alkali hydroxide or chain terminator are mixed in a first step to form a first input stream and in a second step polycarbonate producing catalyst with or without chain terminator is added as a second input stream said first input stream and said second input stream being controlled by the value of the relative viscosity of the polycarbonate, wherein the relative viscosity of the resulting polycarbonate is measured at the end of the reaction, a viscosity number (VZ0).
defined as V number $= 100 \times$ (relative viscosity $-1$) is calculated from the measured concentration and quantity of phosgene, bisphenol, catalyst and alkali hydroxide and applying an empirical relation conforming to $$V \text{ number} = a + b.n + c.n^2$$

in which n denotes the average number of bisphenol units in the polymer chain which is calculated from the measured concentrations and quantities in which a, b, c ... are empirical constants and the variation in time of the Vnumber VZ0(t) is calculated from the measured variations in time of the input streams and concentrations;

This calculation of the V number (VZ*) (and the OH or $CO_3$ output concentrations: OH* or $CO_3$* respectively), can e.g. be done with a step response $$W(s) = \pi \prod_{i=1}^{k} \frac{1}{(1 + T_i s)^{n_i}}$$

giving VZ*(s)=W(s)×VZ0(s), wherein VZ0(s) is the Laplace transform of VZ0(t) and VZ*(s) is the Laplace transform of VZ*(t) wherein s denotes the independent variable, W(s) the output (VZ*, OH* or $CO_3$*), i the index for the time constants. k the number of different time constants, $n_i$ an integer denoting the multiplicity of time constant i and $T_i$ the resident time. A V number VZ** is then formed by adding a correction term ΔVZ to VZ*: VZ**=VZ*+ΔVZ resulting in a minimization of the deviation between VZ and the measured Vnumber; the correction term $\Delta VZ^{new} = \Delta VZ^{old} + f$ (VZ measured−VZ) is recalculated every time a new measured V number is available, and the calculated values VZ** together with the concentrations of the input streams are converted into control variables which set the input streams of the running reaction and with or without converting (correspondingly to the V number) the concentration of the alkali hydroxide or of the alkali carbonate or of both at the end of the reaction into control variables which set the input streams of the running reaction comprising the steps: measurement of the OH— or $CO_3$ concentration, calculation of the OH— or $CO_3$ concentration, calculation of the variation in time of the OH— or $CO_3$ concentration (forming OH* or $CO_3$*) correction and minimization of the calculated OH— or $CO_3$ concentration (forming OH or $CO_3$) conversion of the recalculated OH— or $CO_3$ concentration (OH or $CO_3$) into control variables which additionally set the input streams of the running reaction.

In a preferred embodiment of the process the deviation between the calculated Vnumber VZ** and the measured V number VZ is minimized comprising the following steps each time a new measured Vnumber is available:

$$\Delta VZ^{(new)} = \Delta VZ^{(old)} + RVZ(VZ_{measured} - VZ^{**}),$$

wherein $\Delta VZ^{(new)}$ denotes the corrected calculated deviation of the V number, $\Delta VZ^{(old)}$ the last corrected deviation of the calculated V number, RVZ an empirical constant, VZ* the firstly calculated V number and VZ the measured V number.

In another preferred embodiment of the process the concentration of the alkali hydroxide or of the alkali carbonate or of both at the end of the reaction additionally control the input streams of the running reaction.

In a particularly preferred embodiment of the invention the two-phase interfacial process comprises the following process steps:

a) mixing the organic and aqueous phases in a tank reactor with a circulation loop, b) forming an emulsion in the tank reactor with the circulation loop, adjusting a temperature of less than 60° C.—in the circulation loop with the aid of a heat exchanger, maintaining the tank reactor with the circulation loop an average dwell time of at least 2 minutes and the emulsion being continuously removed from the tank reactor, c) introducing this emulsion into a tube reactor which is equipped with mixing and dwell zones and for a total dwell time of at least 2 minutes, the organic phase is a solvent for the polycarbonate and contains phosgene, and the aqueous phase consists of water and a mixture of an alkali metal hydroxide and phenolic components.

Another preferred embodiment of the invention comprises the following sequential process steps:

a) preheating a 10 to 30% by weight alkali bisphenolate solution to at least 45° C., the percentages by weight being based on the weight of alkali bisphenolate in the aqueous solution, and the solution having a minimum content of free alkali hydroxide, b) introducing gaseous phosgene in methylene chloride or chlorobenzene or a mixture of methylene chloride/chlorobenzene in such quantities that, based on the quantity of alkali bisphenolate employed in step a), a molar excess of phosgene of from 5 to 80 mol % is present, c) mixing the solutions of steps a) and b) in a mixer which delivers the mixed emulsion into a tube at least partially in a counter-gravitational direction, d) with or without introducing an additional amount of alkali bisphenolate into this tube after a dwell time of at least 10 seconds without dissipation of the heat reaction.

e) subsequently adding chain terminators and alkali hydroxide solution to establish a pH value of 11 to 14, f) subsequently dissipating the heat of reaction in a stirred vessel and building up the polymer chain by adding alkali hydroxide solution and a catalyst, an oil-in-water emulsion being present in the stirred vessel.

In a particularly preferred embodiment of the inventive process the calculated input streams of phosgene, chain terminator, solvents, catalyst or alkali hydroxide are the control variables.

In carrying out the possible processes described above for the continuous production of polycarbonates, the concentrations of the diphenol, alkali metal hydroxide and chain terminator in the aqueous phase and the quantity of diphenol in the aqueous phase are continuously measured by known methods, preferably at time intervals which are shorter than the residence time of the starting materials or their reaction products in the reactor system:

For each metering point for the additional introduction of alkali metal hydroxide, the concentration and quantity of alkali metal hydroxide used are measured; the metering of chain terminator, phosgene and catalyst is also determined. In addition, the OH concentration and the alkali metal carbonate ($CO_3$) concentration at the reactor exit are both measured, as is the V number of the polycarbonate isolated from the organic phase. The water content, if any, of the organic phase after separation and the pressure, temperature and flows in the individual reactors are also measured.

Process management is also based on a) prediction of the output variables, particularly the V number, from the trend of input variables and measured disturbances using a dynamic process model. The process model is based on offline determination of the process kinetics, on the mathematical description of the apparatus, on empirical corrections for effective adaptation to process data and on known models of the sensors. The complete model is simplified by known methods to the extent that it simulates in real time parallel to the process and may therefore be used as the basis of an observer. This observer enables non-measurable disturbances and their effects to be taken into consideration.

b) continuous correction of the process model in real time by feeding back all the measured output variables (V numbers or OH and $CO_3$ concentration). The feedback is based on a dynamic disturbance model which statistically describes the deviations detected in the process. Using the control system theory, feedback is designed in such a way that the average deviation between the process model and the process is minimized. Any methods of state and parameter estimation which are known in the system theory are suitable as feedback. A non-linear stationary Kalman filter is particularly suitable. The process model with feedback is referred to hereinafter as the observer.

c) the estimated variables, particularly the V number, are then fed back to control the process with a suitable control algorithm. The estimated variables are fed back parallel to the observer. Any control process with which required specifications for variation of the adjusted variables and deviations in the set values, particularly the V number, can be followed is suitable. These may be the known P, PI, PID, model predictive controller, space control, state and other controllers. However, control by an inverse process model, with which the adjusted variables can be set from the estimated variables, is particularly suitable for this purpose.

Disturbances accessible to measurement (primarily variations in the input concentrations) are directly eliminated by feed forward compensation using mathematically described correlations which take time-related behavior into consideration (dynamic model). The feedforward compensation is selected so that the effects of the disturbance are minimized. Thus, measured variations in the input concentration lead to a re-calculation of the adjusted variables and are thus directly compensated.

Better V number constancy results (e.g. standard deviation <0.15 for a V number of 20 to <0.3 for a V number of 28). In addition, the specification is reached more quickly after variations in load and changes in the V number (for example from 20 to 24 t per hour or a change in V number from 21.5 to 25.0 in under 30 minutes).

The preferred location for measurement of the output variables is directly at the end of the reaction (i.e. behind the holding tube or behind a stirred tank). Improved measured values may optionally be achieved by homogeneously or diversitarily redundant measurements at the same or different places.

Further improvements are obtained by monitoring and filtering of the measured values both for input and for output variables.

The difference between prediction and measurement, for example in the form of a statistic through variance and mean value or a test for white noise, is determined and, in the event of deviations from expected values, this statistic is used to adapt the dynamics of estimation of the process observer. In addition, monitoring of these deviations is used for detecting disturbances.

The process according to the invention embodies a number of advantages and improvements over the prior art. It compensates measurable disturbances and, in particular, measurable changes in the input variables. Variations in the V number are thus reduced and, in the event of changes in formulation or in load, the process is rapidly attuned to the new operating point. In addition, non-measurable disturbances are quickly recognized and compensated by feedback. This is optimally achieved above all through the use of a process model. The safe method of operation is guaranteed, even in the vicinity of specification limits, so that starting materials and operating means can also be saved.

The new process is described by way of example in the following with reference to the accompanying drawings. The Examples are the simplest designs of the above-described process which lead to an improvement in V number constancy. Applications to other apparatus systems and metering arrangements are known to the expert from the explanations in this Example and the foregoing teaching.

EXAMPLES a) Comparison Example 148.1 kg/h 15% by weight diphenol solution which contains 2,2'-bis-(4-hydroxyphenyl)-propane (bisphenol A) as diphenol and 2 mol sodium hydroxide per mol diphenol and which is present at 35° C. under normal pressure, are introduced together with 10.7 kg/h phosgene (approx. 11 mole-% excess) and 113.0 kg/h of a solvent mixture of 50% by weight methylene chloride and monochlorobenzene into the circulation loop of a tank reactor R1 through tee pieces arranged in close proximity to one another. The circulation reactor is equipped with a pump, a heat exchanger and a tank reactor from which the reaction solution is pumped into the dwell zone via a T shaped outlet. A pump and mixing elements are installed in the circulation loop. The inflowing streams are pumped around at such rates that a turbulent flow is established. Sodium hydroxide is introduced ahead of the heat exchanger in such quantities that an alkali metal concentration of 0.2% by weight is present in the aqueous phase. The circulation reactor has a total volume of approximately 45 l. Behind the T-shaped outlet, 3 kg/h chain terminator solution consisting of 7.8% by weight phenol in the above-mentioned solvent mixture are introduced through another tee piece. Behind the circulation reactor is a tube coil reactor R2 with mixing and dwell zones and a total volume of approximately 30 l which is connected to the outlet of the circulation reactor by a pipe and a pump. The tube coil reactor is followed by another tube coil reactor of the same type which opens into a separation vessel R3 with a total volume of approximately 150 l and a separation area of approx. 1.6 m$^2$. Behind the first tube coil reactor, 6.0 kg/h catalyst solution consisting of 1.4% by weight N-ethyl piperidine and 98.6% by weight water is introduced, again through a T-shaped outlet, at the same time as more sodium hydroxide, the sodium hydroxide being added in such a quantity that an alkali concentration of 0.2% by weight is established in the aqueous phase. Organic and aqueous phase are separated in the separation vessel. The concentration of OH and carbonate is measured in the aqueous phase, polycarbonate is isolated from the organic phase by evaporation of the solvent and the V number is determined by capillary viscosimetry.

The quantity, bisphenol concentration and sodium hydroxide concentration of the bisphenolate solution are measured before its entry E1 into the circulation reactor R1. The concentration and quantity of sodium hydroxide are determined before each addition E2. The quantities of phosgene, chain terminator and catalyst added (E2, E3) are determined on-line. The measurements are carried out on-line.

The continuous process is carried out for three days with the temperature, metering and concentration variations which normally have to be taken into account in the prior art. The V number is measured every 30 minutes while the other variables are continuously measured. Concentration variations are from 1 to 5%, metering variations from 1 to 6% and temperature variations from 2° to 5° C. In the event of relatively large variations in the V number, the process is adjusted by changing the metering (for example: increasing the quantity of chain terminator when the V number becomes too high). An average V number of 28.2 with a standard deviation of ±0.6 is obtained over the test period.

b) Example according to the Invention

In the same production plant, the V numbers are measured for three days at the same intervals as in the Comparison Example using the process according to the invention.

For calculating the average molecular weight Mn (number average molecular weight, as determined by GPC) as well as OH and $CO_3$ concentration, the following known reactions: the saponification reaction of phosgene with sodium hydroxide and terminal Cl groups with sodium hydroxide and the reaction of the phosgene with bisphenol or phenolate, the termination reaction with the chain terminator phenol and the chain buildup of the terminal chloroformyl group with a terminal phenolate group are all taken into consideration.

1. Stationary Part

Using the balances of the above-mentioned main reactions and the mass balances of the apparatus and assuming a complete reaction, the average number n of BPA units per polycarbonate molecule is determined from the input variables and calculated using an empirical Mark-Houwink relation adapted to the process. For example, by expansion into a series of the form number-$=a+b*n+c*n^2+\ldots$ with $a=5.36$, $b=0.505$ and $c=-0.0018$, the V number (VZ0) range of 16 to 35 is valid. Further output variables of the model are OH and $CO_3$ concentrations in the outflow.

The input variables are: a) bisphenolate solution: quantity, concentration of bisphenol, sodium hydroxide; b) sodium hydroxide: concentration, quantity; c) chain terminator: quantity; d) phosgene: quantity; e) catalyst: quantity.

2. Dynamic Part

The dynamics were divided into 3 parts, namely:

a) a step response W(S) to unit steps of VZ0, OH0 or CO30 in the following form (in Laplace space)

$$W(s) = \pi \prod_{i=1}^{k} \frac{1}{(1+T_i s)_i{}^{n_i}}$$

where s is the independent variable, W(s) the output (VZ*, OH* or $CO_3$* respectively to a step response), i is an index for the time constants, k the number of different time constants and $n_i$ an integer denoting multiplicity of time constant i. The $T_i$ themselves depend on the load: $T_i = T_i 0/\text{load}$. In the present case two simple first-order delay elements with typically $T_i = 7$ min and $T_2 = 16$ min and $n_i = n_2 = 1$ are sufficient for the prediction of OH* and $CO_3$*. For VZ* another delay time $T_3 = 30$ min with $n_3 = 1$ must be taken into account.

b) A dead time which is produced by transport processes and which is also load-dependent in the form mentioned above. For the present Example, this dead time was 0 mins.

c) A measurement dead time which is different for each output variable: the measurement dead time is obtained by determining the time between sampling and the result of analysis so that varying sampling times and varying measuring times are taken into consideration. In calculating the model correction, the correction is carried out for the sampling time and the momentary values are calculated by forward integration.

3. Verification and Disturbance Model

The above-described model was verified both from complete kinetics and from process data and was found to be suitable for the observation function. The model provides predictions of the output variables V number, OH and $CO_3$ concentration which are termed VZ*, OH* and $CO_3$* in the following. Due to non-measurable disturbances, however, these predicted values do not exactly accord with the values actually observed so that a disturbance model adapted to the process was added to the model. The disturbances observed were predominantly transient disturbances so that the model equations were extended by the following disturbance model of the deviations from predicted and estimated V number: $\Delta VZ$, OH concentration:

$\Delta OH$ and $CO_3$ concentration $\Delta CO_3$:

$d/dt\ \Delta VZ = 0$ $d/dt\ \Delta OH = 0$ $d/dt\ \Delta CO_3 = 0$ and the prediction was corrected accordingly:

$VZ^{**} = VZ^* + \Delta VZ$ $OH^{**} = OH^* + \Delta OH$ $CO_3^{**} = CO_3^* + \Delta CO_3$ In an observer feedback, only the disturbance variables are corrected corresponding to $\Delta VZ^{(new)} = \Delta VZ^{(old)} + RVZ \cdot (VZ_{measured} - VZ^{})$ $\Delta OH^{(new)} = \Delta OH^{(old)} + ROH \cdot (OH_{measured} - OH^{})$ $\Delta CO_3^{(new)} = \Delta CO_3^{(old)} + RCO_3 \cdot (CO_{3\,measured} - CO_3^{**})$ where $\Delta VZ^{(old)}$ is the value of $\Delta VZ$ before and $\Delta VZ^{(new)}$ the value of $\Delta VZ$ after a measurement $VZ_{measured}$ is taken into account. The following optimal feedback constants being observed:

$RVZ = 0.25$ $ROH = 0.3$ $RCO_3 = 0.3$.

4. Control

A simple P control in conjunction with the inverse process model was used in the present case. The adjustable variables concern all the input streams, i.e. the streams of bisphenolate, alkali metal hydroxide, solvent, chain terminator and catalyst. In addition to the V number, the OH, $CO_3$ and polycarbonate concentration and the ratio of bisphenolate to catalyst are kept constant. The adjustable variables are delayed via a first-order delay element to avoid surges. Changes in the set values lead to an immediate change in the adjustable variables.

5. Feed-Forward Compensation

Measured changes in the input concentrations lead to a re-calculation of the adjustable variables and are thus immediately compensated.

Average V numbers of 28.2 with a standard deviation of $\leq \pm 0.2$ are obtained in this way.

c) Example According to the Invention

The process is carried out in the same way as in Example b), but using an adaptive Kalman filter for estimating delta VZ. Measurement noise of 0.3 VZ number points is assumed and the process noise is adapted to the process by observing the variance of the innovation. This results in the more rapid control of major and sudden disturbances.

Redundance and plausibility rules were also utilized to monitor the measured values with the result that the VZ number variations were below ±0.3 units.

FIG. 1 shows a schematic diagram of the process.

In FIG. 1 denote

E1: Input stream 1 comprising bisphenol, alkali hydroxide, water, organic solvent and phosgene.
E2: Input stream 2 comprising alkali hydroxide and chain terminator.
E3: Input stream 3 comprising catalyst.
R1: Reaction step 1.
R2: Reaction step 2.
R3: Reaction step 3.
R: Controller.
SA: "Feed forward" part of the controller.
PM-1: "Feed back" part of the controller.
M1: Measurement of the input quantities streams of:
  Bisphenol solution, phosgene, organic solvent, alkali hydroxide solution, chain terminator, catalyst concentrations of:
  Bisphenol solution, alkali hydroxide, chain terminator solutions.
M2: Measurement of the output quantities:
  Relative viscosity as viscosity number (VZ) concentration of alkali hydroxide and alkali carbonate.
B: Calculation of the viscosity number (VZ*) respectively (VZ**), $\Delta$VZ and the corresponding values for OH* and CO$_3$* respectively.
SW: Set point of the controlled variables:
  Bisphenol quantity, viscosity number, concentrations of alkali hydroxide, alkali carbonate, polycarbonate bisphenol/catalyst ratio.
Product P: Outflowing Product Stream.

The measurement M2 of the output variables takes place after the last process stage R3. The measurement M1 of the input variables takes place from the corresponding introduction or metering positions E1, E2, E3. Both series of data enter the observer B which consists of the process model PM, a sensor model SM for taking disturbances in the actual measuring process into account and a correcting unit K which compares the measured variables with the estimated variables.

The observer B sends the results of the estimation continuously to the inverse process model controller PM-1 where the input streams E1 to E3 are reset from the predetermined set values SW, estimated values and actual states (from M1) via a setting process (SA) taking the actual streams into account.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polycarbonates by the two-phase interfacial method in at least two reaction steps, in which a phosgene-containing organic phase and a bisphenol-containing water phase with or without alkali hydroxide or chain terminator are mixed in a first step to form a first input stream and in a second step polycarbonate producing catalyst with or without chain terminator is added as a second input stream, said first input stream and said second input stream being controlled by the value of the relative viscosity Of the polycarbonate, wherein the relative viscosity of the resulting polycarbonate is measured at the end of the reaction, a viscosity number (VZ*) defined as V-number=100×(relative viscosity −1) is calculated from the measured concentration and quantity of phosgene, bisphenol, catalyst and alkali hydroxide and applying an empirical relation conforming to $$V\text{-number} = a + b.n + c.n^2$$

in which n denotes the average number of bisphenol units in the polymer chain which is calculated from the measured concentrations and quantities in which a, b, c . . . are empirical constants and the variation in time of the V number is calculated from the measured variations in time of the input streams and concentrations; a V number VZ** is then formed by adding a correction term $\Delta$VZ to VZ* resulting in a minimization of the deviation between VZ and the measured V number; the correction term $\Delta VZ^{(new)} = \Delta VZ^{(old)} + f$ (VZ measured $-$ VZ) is recalculated every time a new measured V number is available, and the calculated VZ** together with the concentrations of the input streams are converted into control variables which set the input streams of the running reaction and with or without converting correspondingly the concentration of the alkali hydroxide or of the alkali carbonate or of both at the end of the reaction into controlled variables to set the input streams of the running reaction.

2. A process as claimed in claim 1, wherein the deviation between the calculated V-number VZ** and the measured V-number VZ is minimized comprising the following steps each time a new measured V number is available:

VZ** = VZ* + $\Delta$VZ with
$\Delta VZ^{(new)} = \Delta VZ^{(old)} + RVZ(VZ_{measured} - VZ^{**})$,
wherein $\Delta VZ^{(new)}$ denotes the corrected calculated deviation of the V-number, $\Delta VZ^{(old)}$ the last corrected deviation of the calculated V-number, RVZ an empirical constant, VZ* the firstly calculated V-number and VZ the measured V-number.

3. A process as claimed in claim 1, characterized in that the concentration of the alkali hydroxide or of the alkali carbonate or of both at the end of the reaction additionally control the input streams of the running reaction.

4. A process as claimed in claim 1, characterized in that a controller selected from the group of proportional, proportional-plus-integral, proportional-plus-integral-plus-derivative state controller or cascade controllers, self-adjusting controllers, frequency-dependent controllers, nonlinear controllers, model predictive controllers, multivariable or decoupling controllers converts the variables calculated into control variables.

5. A process as claimed in claim 2, wherein the constant RVZ denotes 0.25.

6. Process according to claim 1, characterized in that the two-phase interfacial process comprises the following process steps:
   a) mixing the organic and aqueous reaction phases in a tank reactor with a circulation loop,
   b) forming an emulsion in the tank reactor with the circulation loop, adjusting a temperature of less than 60° C. in the circulation loop with the aid of a heat exchanger, maintaining the tank reactor with the circulation loop an average dwell time of at least 2 minutes and the emulsion being continuously removed from the tank reactor,
   c) introducing this emulsion into a tube reactor which is equipped with mixing and dwell zones and for a total dwell time of at least 2 minutes,
wherein the organic phase is a solvent for the polycarbonate and contains phosgene, and the aqueous phase consists of water and a mixture of an alkali metal hydroxide and phenolic components.

7. Process according to claim 1, characterized in that the two-phase interfacial process comprises the following sequential process steps:
   a) preheating a 10 to 30% by weight alkali bisphenolate solution to at least 45° C., the percentages by weight being based on the weight of alkali bisphenolate in the aqueous solution, and the solution having a minimum content of free alkali hydroxide,
   b) introducing gaseous phosgene in methylene chloride or chlorobenzene or a mixture of methylene chloride/chlorobenzene in such quantities that, based on the quantity of alkali bisphenolate employed in step a), a molar excess of phosgene of from 5 to 80 mol % is present,
   c) mixing the solutions of steps a) and b) in a mixer which delivers the mixed emulsion into a tube at least partially in a counter-gravitational direction,
   d) with or without introducing an additional amount of alkali bisphenolate into this tube after a dwell time of at least 10 seconds without dissipation of the heat of reaction,
   e) subsequently adding chain terminators and alkali hydroxide solution to establish a pH value of 11 to 14,
   f) subsequently dissipating the heat of reaction in a stirred vessel and building up the polymer chain by adding alkali hydroxide solution and a catalyst, an oil-in-water emulsion being present in the stirred vessel.

8. Process according to claim 6, characterized in that the V number is measured directly at the end of the reaction.

9. A process as claimed in claim 1, wherein calculated input streams of phosgene, chain terminator, solvents, catalyst or alkali hydroxide are the control variables.

* * * * *